(12) United States Patent
Lin

(10) Patent No.: US 12,549,359 B2
(45) Date of Patent: Feb. 10, 2026

(54) MICRO-CONTROLLER, SECURE SYSTEM, AND PROTECTION METHOD

(71) Applicant: Nuvoton Technology Corporation, Hsinchu Science Park (TW)

(72) Inventor: Zong-Min Lin, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 21 days.

(21) Appl. No.: 18/782,322

(22) Filed: Jul. 24, 2024

(65) Prior Publication Data
US 2025/0070969 A1    Feb. 27, 2025

(30) Foreign Application Priority Data

Aug. 22, 2023   (TW) ................. 112131442

(51) Int. Cl.
H04L 29/06 (2006.01)
G06F 21/10 (2013.01)
H04L 9/08 (2006.01)
G06F 21/12 (2013.01)

(52) U.S. Cl.
CPC .......... H04L 9/0894 (2013.01); G06F 21/107 (2023.08); G06F 21/121 (2013.01)

(58) Field of Classification Search
CPC ... H04L 9/0894; H04L 9/0822; H04L 9/0825; H04L 9/0897; H04L 2209/60; G06F 21/107; G06F 21/121; G06F 21/602; G06F 21/6218; G06F 21/72; G06F 21/74; G06F 2221/2105; G06N 3/10
See application file for complete search history.

(56) References Cited

U.S. PATENT DOCUMENTS

| 12,001,577 | B1* | 6/2024 | Xiong | G06N 3/04 |
| 2019/0296910 | A1* | 9/2019 | Cheung | G06N 3/10 |
| 2020/0019697 | A1* | 1/2020 | Shen | G06F 21/14 |
| 2023/0155819 | A1* | 5/2023 | Shin | H04L 9/3247 713/153 |

FOREIGN PATENT DOCUMENTS

| CN | 103427984 B | 4/2018 |
| CN | 114266060 A | 4/2022 |
| TW | 202028991 A | 8/2020 |
| TW | 202145041 A | 12/2021 |
| WO | WO2016040536 A1 | 6/2020 |

* cited by examiner

Primary Examiner — Harunur Rashid
(74) Attorney, Agent, or Firm — Muncy, Geissler, Olds & Lowe, P.C.

(57) ABSTRACT

A micro-controller including a secure world, a non-secure world, and a processing circuit is provided. The secure world includes a key management device, a decryption circuit, and a first memory. The key management device stores a secret key. The decryption circuit utilizes the secret key to decrypt an encrypted model to generate a decrypted model. The first memory stores the decrypted model. The non-secure world includes a second memory and a third memory. The second memory stores the encrypted model. The third memory stores an inference result. The processing circuit provides input data to the decrypted model. The decrypted model generates the inference result according to the input data.

16 Claims, 3 Drawing Sheets

MICRO-CONTROLLER, SECURE SYSTEM, AND PROTECTION METHOD

CROSS REFERENCE TO RELATED APPLICATIONS

This application claims priority of Taiwan Patent Application No. 112131442, filed on Aug. 22, 2024, the entirety of which is incorporated by reference herein.

BACKGROUND OF THE INVENTION

Field of the Invention

The present invention relates to micro-controller, and, in particular, to a micro-controller with high security.

Description of the Related Art

With the development of science and technology, information security problems have also increased. Before data is stored in a memory, the data may be intercepted by illegal users. Even if the data is stored in a memory, the data may still be stolen by illegal users.

BRIEF SUMMARY OF THE INVENTION

In accordance with an embodiment of the disclosure, a micro-controller comprises a secure world, a non-secure world, and a processing circuit. The secure world comprises a key management device, a decryption circuit, and a first memory. The key management device stores a secret key. The decryption circuit utilizes the secret key to decrypt an encrypted model to generate a decrypted model. The first memory stores the decrypted model. The non-secure world comprises a second memory and a third memory. The second memory stores the encrypted model. The third memory stores an inference result. The processing circuit provides input data to the decrypted model. The decrypted model generates the inference result according to the input data.

In accordance with an embodiment of the disclosure, a secure system comprises a micro-controller and an offline tool. The micro-controller comprises a secure world, a non-secure world, and a processing circuit. The secure world comprises a key management device, a decryption circuit, and a first memory. The key management device stores a secret key. The decryption circuit utilizes the secret key to decrypt an encrypted model to generate a decrypted model. The first memory stores the decrypted model. The non-secure world comprises a second memory and a third memory. The second memory stores the encrypted model. The third memory stores an inference result. The processing circuit provides input data to the decrypted model. The decrypted model generates the inference result according to the input data. The processing circuit stores the inference result in the third memory. The offline tool comprises an encryption circuit. The encryption circuit utilizes the secret key to encrypt a network model to generate the encrypted model and storing the encrypted model in the second memory.

A protection method for a processing circuit is provided. An exemplary embodiment of a protection method for a processing circuit is described in the following paragraph. In a non-secure mode, an encrypted model in a non-secure world is read, a software function in a secure world is called, and a secure mode is entered. In the secure mode, the software function is executed. The software function is executed to read a secret key in the secure world, utilize the secret key to decrypt the encrypted model to generate a decrypted model, and execute the decrypted model to generate an inference result.

Protection method may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a processing circuit and a micro-controller for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
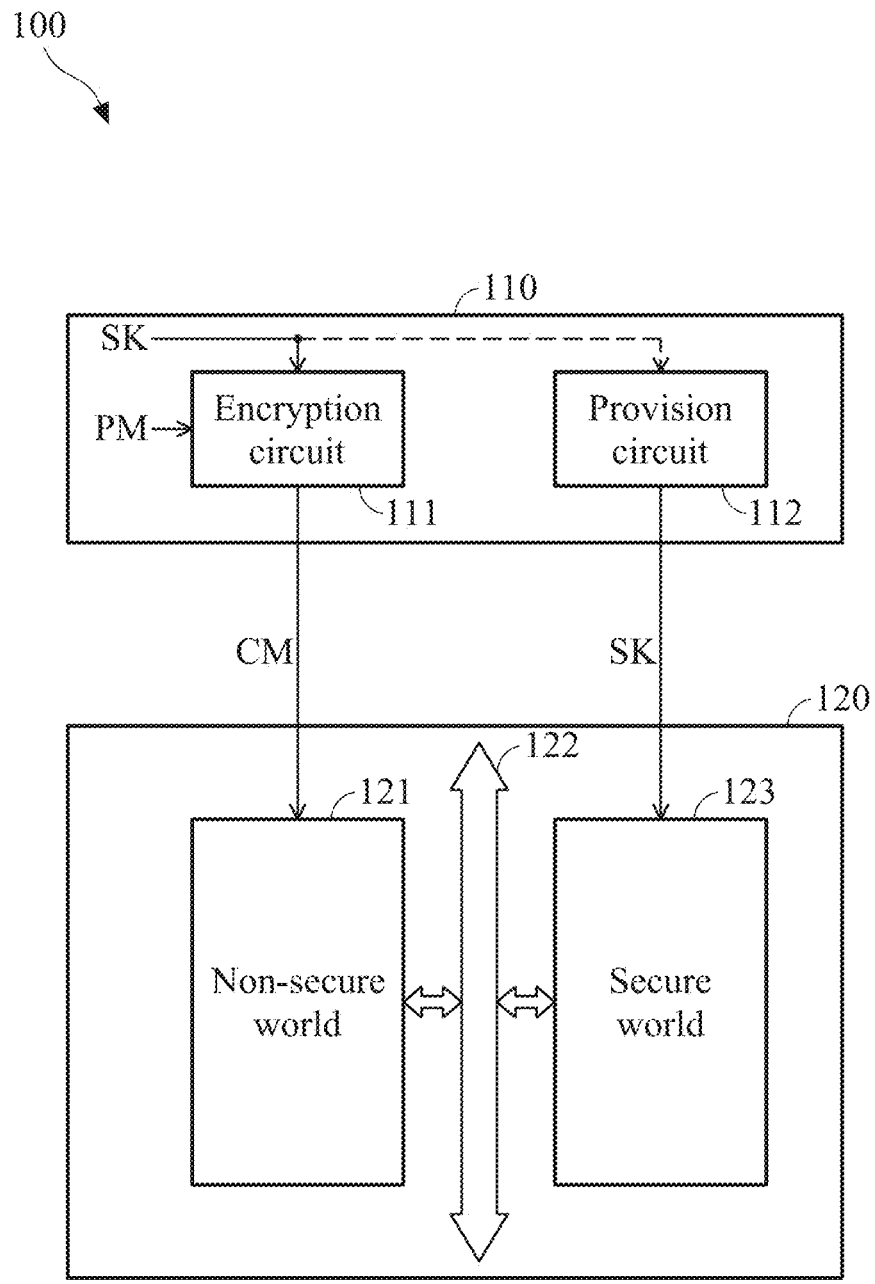
FIG. 1 is a schematic diagram of an exemplary embodiment of an secure system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an secure system according to various aspects of the present disclosure. The secure system 100 comprises an offline tool 110 and a micro-controller 120. The offline tool 110 comprises an encryption circuit 111 and a provision circuit 112. The encryption circuit 111 utilizes a secret key SK to execute an encryption operation for a network model PM to generate an encrypted model CM. In one embodiment, the encryption operation executed by the encryption circuit 111 is a symmetric encryption operation, such as AES algorithm. The structure of the encryption circuit 111 is not limited in the present disclosure. Any circuit can serve as the encryption circuit 111, as long as the circuit has an encryption function. In some embodiments, the network model PM is an artificial neural network model. In one embodiment, the filename extension of the network model PM is .tflite. In other embodiments, the filename extension of the encrypted model CM is .encrypt.

The provision circuit 112 uses a secure key provision process to provision the secret key SK into the secure world 123 of the micro-controller 120. The structure of the provision circuit 112 is not limited in the present disclosure. Any circuit can serve as the provision circuit 112, as long as the circuit can securely transmit the secret key SK. In one embodiment, the provision circuit 112 is independent of the offline tool 110. In another embodiment, the secret key SK is provisioned by an internet interface (not shown). In this case, the internet interface provisions the secret key SK into the secure world 123 of the micro-controller 120.

In other embodiments, the encryption circuit 111 may encrypt the secret key SK and then provide the encrypted secret key to the provision circuit 112. The provision circuit 112 provisions the encrypted secret key into the secure world 123. The invention does not limit how the encryption circuit 111 encrypts the secret key SK. In one embodiment, the encryption circuit 111 uses a non-symmetric encryption operation (e.g., an ECC algorithm or an RSA algorithm) to encrypt the secret key SK.

In this embodiment, the offline tool 110 is independent of the micro-controller 120. Before the offline tool 110 connects to the micro-controller 120, the offline tool 110 may generate the encrypted model CM in advance. In this case, after the offline tool 110 connects to the micro-controller 120, the offline tool 110 immediately provides the encrypted model Cm and the secret key SK to the micro-controller 120. After receiving the encrypted model CM and the secret key SK, the micro-controller 120 is capable of working normally even if the offline tool 110 does not connect to the micro-controller 120. In one embodiment, the offline tool 110 transmits the encrypted model CM to the micro-controller 120 via a non-secure channel, such as an internet connection. Since the secret key SK is stored in the secure world 123 of the micro-controller 120, even if an unauthorized person obtains the encrypted model CM, the unauthorized person cannot successfully decrypt the encrypted model CM.

The micro-controller 120 comprises a non-secure world 121, a bus 122, and a secure world 123. In one embodiment, the micro-controller 120 uses Arm Trustzone technology to plan the non-secure world 121 and the secure world 123. The non-secure world 121 stores the encrypted model CM. The secure world 123 stores the secret key SK. The bus 122 is coupled between the non-secure world 121 and the secure world 123 to transmit the data from the non-secure world 121 to the secure world or transmit data from the secure world 123 to the non-secure world 121.

In some embodiments, the micro-controller 120 is disposed in a terminal device of an internet of things (IoT). Although the encrypted model CM is stored in the non-secure world 121 of the microcontroller 120, the security can be improved because the encrypted model CM is protected by encryption. Even if an illegal user steals the encrypted model CM of the microcontroller 120, the illegal user cannot obtain the network model PM.

Figure 2:
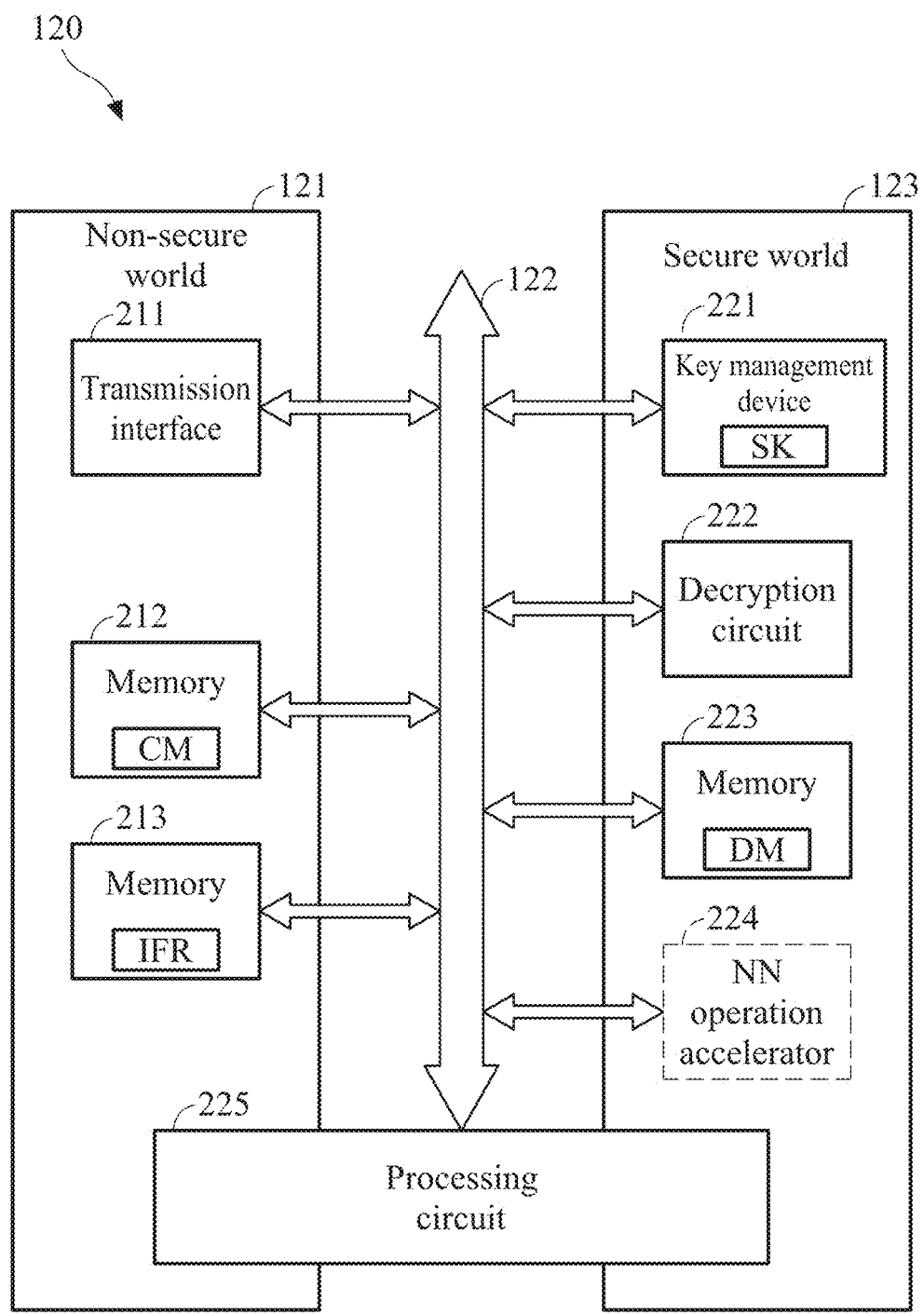
FIG. 2 is a schematic diagram of an exemplary embodiment of a micro-controller according to various aspects of the present disclosure.

FIG. 2 is a schematic diagram of an exemplary embodiment of a micro-controller according to various aspects of the present disclosure. The non-secure world 121 comprises a transmission interface 211, and memories 212 and 213. The transmission interface 211 is configured to receive the encrypted model CM. The transmission interface 211 may use the bus 122 to transmit the encrypted model CM to the memory 212. The kind of transmission interface 211 is not limited in the present disclosure. In one embodiment, the transmission interface 211 is an internet interface.

The memory 212 stores the encrypted model CM. The memory 213 stores an inference result IFR. In some embodiments, the memory 212 is a non-volatile memory (NVM), such as a read only memory (ROM). The memory 213 may be a volatile memory, such as a random access memory (RAM).

The secure world 123 comprises a key management device 221, a decryption circuit 222 and a memory 223. The key management device 221 stores the secret key SK. The key management device 221 outputs the secret key SK according to a requirement sent by a specific circuit. For example, the encryption circuit 111 uses the AES algorithm to encrypt the network model PM. In this case, when a hardware device (such as the decryption circuit 222) that complies with the AES algorithm issues a requirement, the key management device 221 outputs the secret key SK to the bus 122. When the requirement received by the key management device 221 does not come from a hardware device that complies with the AES algorithm, the key management device 221 does not output the secret key SK. In one embodiment, the key management device 221 is a keystore.

The decryption circuit 222 reads the key management device 221 to obtain the secret key SK and uses the secret key SK to execute a decryption operation on the encrypted model CM to generate a decrypted model DM. In one embodiment, the decryption circuit 222 uses a symmetric decryption operation to process the encrypted model CM. The type of the decryption operation used by the decryption circuit 222 is the same as the type of the encryption operation used by the encryption circuit 111. Therefore, the decrypted model DM is the same as the network model PM. Additionally, since the type (e.g., an AES algorithm) of the decryption operation used by the decryption circuit 222 is the same as the type (e.g., an AES algorithm) of the encryption operation used by the encryption circuit 111, the key management device 221 only accepts access instructions from the decryption circuit 222. In other embodiments, the secret key SK of the key management device 221 may be an encrypted key. In this case, the decryption circuit 222 first decrypts the secret key SK of the key management device 221 and uses the decrypted secret key to process the encrypted model CM.

The invention does not limit how the decryption circuit 222 accesses the key management device 221 and the memory 212. In one embodiment, the decryption circuit 222 accesses the key management device 221 and the memory 212 via the bus 122 to obtain the secret key SK and the encrypted model CM. In some embodiments, the decryption circuit 222 is a crypto decrypt accelerator.

The memory 223 stores the decrypted model DM. In one embodiment, the memory 223 uses the bus 122 to receive the decrypted model DM generated by the decryption circuit 222. The kind of memory 223 is not limited in the present disclosure. In one embodiment, the memory 223 is a volatile memory. Since the decrypted model DM is stored in the secure world 123, the illegal user cannot steal the decrypted model DM.

In other embodiments, the micro-controller 120 further comprises a processing circuit 225. In one embodiment, the processing circuit 225 supplies Trustzone's secure mode and Trustzone's non-secure mode. When the processing circuit 225 operates in a non-secure mode, the processing circuit 225 works in the non-secure world 121. When the processing circuit 225 operates in a secure mode, the processing circuit 225 works in the secure world 123.

In the non-secure mode, the processing circuit 225 reads the information (e.g., memory address and the size) of the encrypted model CM of the non-secure world 121. The processing circuit 225 calls a software function of the secure world 123. In one embodiment, the processing circuit 225 provides the memory addresses of the encrypted model CM, input data of the encrypted model CM, and the inference result IFR stored in the memory 213 to a software function. In one embodiment, the software function is a non-secure callable secure function. For example, the software function is a trusted machine learning execution application programming interface.

Then, the processing circuit 225 enters a secure mode. In the secure mode, the processing circuit 225 executes the software function. In the secure mode, the processing circuit 225 directs the decryption circuit 222 to access the secret key SK in the key management device 221. Next, the processing circuit 225 directs the decryption circuit 222 to use the secret key SK to decrypt the encrypted model CM. After decrypting the encrypted model CM, the decryption circuit 222 generates the decrypted model DM. In one embodiment, the processing circuit 225 has a software execution environment of TensorFlow Lite and a TensorFlow Lite Library. The processing circuit 225 uses the TensorFlow Lite Library to interpret the decryption model DM. In this case, the decrypted model DM generates an inference result IFR according to input data. The processing circuit 225 outputs the inference result IFR to the non-secure world 121. Then, the processing circuit 225 enters a non-secure mode. In the non-secure mode, the processing circuit 225 reads the inference result IFR in the non-secure world 121. The structure of the processing circuit 225 is not limited in the present disclosure. In one embodiment, the processing circuit 225 comprises an universal processor, such as a central processing unit (CPU).

In other embodiments, the micro-controller 120 further comprises a neural network (NN) operation accelerator 224. The NN operation accelerator 224 is disposed in the secure world 123. After the decrypted model DM is generated by the decryption circuit 222, the NN operation accelerator 224 uses the bus 122 to read the decrypted model DM stored in the memory 223. The NN operation accelerator 224 provides input data to the decrypted model DM. After the inference result IFR is generated by the decrypted model DM, the processing circuit 225 stores the inference result IFR in the non-secure world 121.

Figure 3:
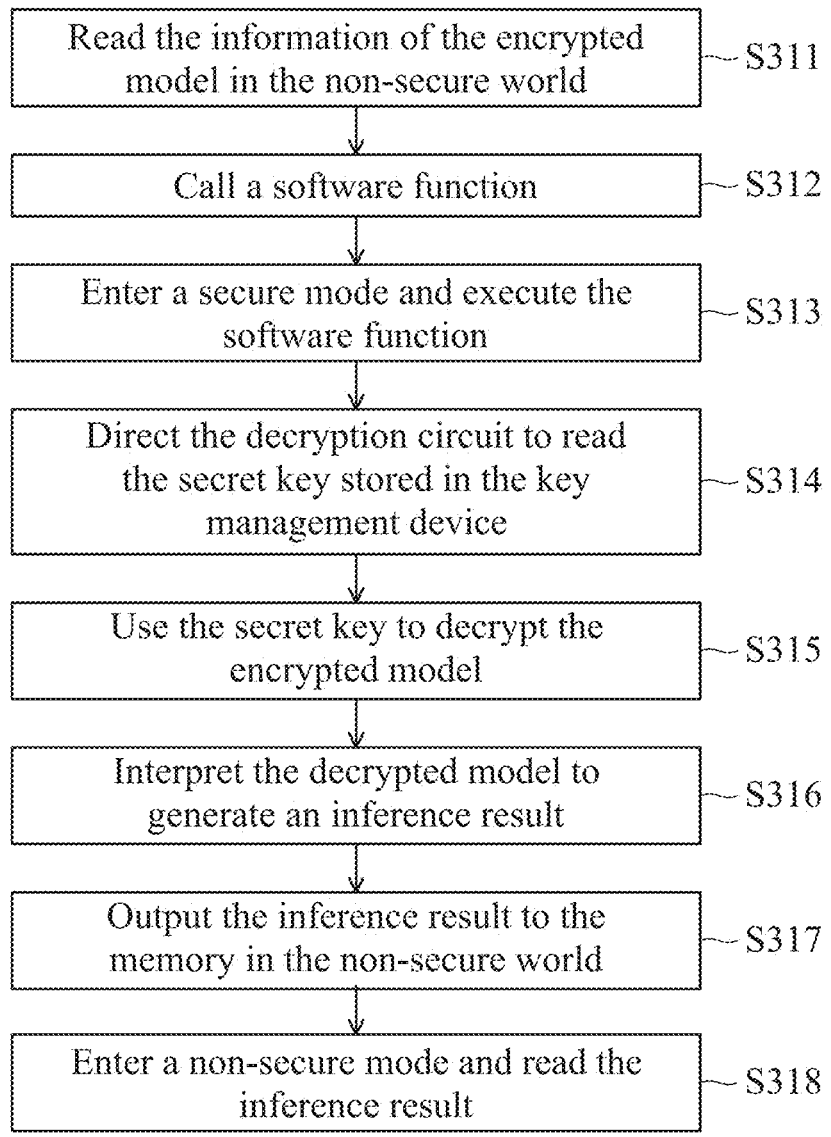
FIG. 3 is a flowchart of an exemplary embodiment of a protection method according to various aspects of the present disclosure.

FIG. 3 is a flowchart of an exemplary embodiment of a protection method according to various aspects of the present disclosure. The protection method may take the form of a program code. When the program code is loaded into and executed by a machine, the machine thereby becomes a processing circuit and a micro-controller for practicing the method.

First, the information of the encrypted model CM in the non-secure world 121 is read (step S311). In one embodiment, the processing circuit 225 reads the information of the encrypted model CM in a non-secure mode. The information of the encrypted model CM may be the address where the encrypted model CM is stored in the memory 212 and the size of the encrypted model CM.

Then, a software function is called (step S312). In one embodiment, the processing circuit 225 operates in a non-secure mode and calls the software function stored in the secure world 123. In some embodiments, the software function is a non-secure callable secure function. The processing circuit 225 may provide the memory addresses of the encrypted model CM, input data, and an inference result to the software function.

Next, the software function is executed (step S313). In one embodiments, the processing circuit 225 first enters a secure mode and then executes the software function. The function of the software function comprises steps S314~S317. In the secure mode, the processing circuit 225 controls the decryption circuit 222 to read the secret key SK stored in the key management device 221 (step S314). In one embodiment, the processing circuit 225 directs the decryption circuit 222 to access the key management device 221 via the bus 122. In this case, the decryption circuit 222 reads the secret key SK of the key management device 221 via the bus 122.

In the secure mode, the processing circuit 225 directs the decryption circuit 222 to use the secret key SK to decrypt the encrypted model CM to generate the decrypted model DM (step S315). In one embodiment, the processing circuit 225 stores the decrypted model DM in the secure world 123.

In the secure mode, the processing circuit 225 interprets the decrypted model DM to generate an inference result (step S3160). In one embodiment, the processing circuit 225 may provide input data to the decrypted model DM. The decrypted model DM processes the input data to generate the inference result IFR. In other embodiments, the processing circuit 225 utilizes TensorFlow Lite Library to interpret the decrypted model DM so that the decrypted model DM performs an interpretation operation.

In the secure mode, the processing circuit 225 outputs the inference result IFR generated by the decrypted model DM to the memory 213 in the non-secure world 121 (step S317). In one embodiment, the processing circuit 225 stores the inference result IFR in the non-secure world 121 via the bus 122.

Then, the processing circuit 225 enters a non-secure mode (step S318). In the non-secure mode, the processing circuit 225 reads the inference result IFR in the non-secure world 121. In one embodiment, the processing circuit 225 performs steps S311, S312, and S318 in the non-secure mode. In this case, the processing circuit 225 performs steps S313~S317 in the secure mode.

Since the secure world 123 of the micro-controller 120 provides a trusted operation environment, the security of the secret key SK can be improved. Furthermore, by encrypting the network model PM, the confidentiality of the network model PM is improved and thievery can be avoided. In addition, when the micro-controller 120 is applied to an IoT terminal device, since the micro-controller 120 uses the secure world 123 to protect the secret key SK, it can prevent illegal users outside the secure world from obtaining the secret key SK.

Protection methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a processing circuit and a micro-controller for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a processing circuit and a micro-controller for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro-controller comprising:
   a secure world comprising:
     a key management device storing a secret key;
     a decryption circuit utilizing the secret key to decrypt an encrypted model to generate a decrypted model; and
     a first memory storing the decrypted model;
   a non-secure world comprising:
     a second memory storing the encrypted model; and
     a third memory storing an inference result; and
   a processing circuit providing input data to the decrypted model,
   wherein the decrypted model generates the inference result according to the input data,
   wherein in a non-secure mode, the processing circuit reads the encrypted model stored in the second memory and calls a software function,
   wherein the processing circuit provides addresses of the encrypted model, the input data and the inference result to the software function, and
   wherein in a secure mode, the processing circuit executes the software function to:
     direct the decryption circuit to read the secret key;
     direct the decryption circuit to utilize the secret key to decrypt the encrypted model to generate the decrypted model; and
     store the decrypted model in the first memory.

2. The micro-controller as claimed in claim 1, wherein the software function is stored in the secure world.

3. The micro-controller as claimed in claim 1, wherein the processing circuit enters the secure mode and executes the software function.

4. The micro-controller as claimed in claim 1, wherein in the secure mode, the processing circuit further executes the software function to:
   execute the decrypted model to generate the inference result;
   store the inference result in the third memory; and
   enter the non-secure mode.

5. The micro-controller as claimed in claim 1, wherein the non-secure world further comprises:
   a transmission interface configured to receive the encrypted model.

6. The micro-controller as claimed in claim 5, wherein the transmission interface is an internet interface.

7. The micro-controller as claimed in claim 1, wherein the second memory is a non-volatile memory, and each of the first and third memories is a volatile memory.

8. The micro-controller as claimed in claim 1, wherein the decrypted model is a neural network model.

9. A secure system, comprising:
   a micro-controller comprising:
     a secure world comprising:
       a key management device storing a secret key;
       a decryption circuit utilizing the secret key to decrypt an encrypted model to generate a decrypted model; and
       a first memory storing the decrypted model;
     a non-secure world comprising:
       a second memory storing the encrypted model; and
       a third memory storing an inference result;
     a processing circuit providing input data to the decrypted model, wherein the decrypted model generates the inference result according to the input data, and the processing circuit stores the inference result in the third memory; and
   an offline tool comprising:
     an encryption circuit utilizing the secret key to encrypt a network model to generate the encrypted model and storing the encrypted model in the second memory,
   wherein in a non-secure mode, the processing circuit reads the encrypted model stored in the second memory and calls a software function,
   wherein the processing circuit provides addresses of the encrypted model, the input data and the inference result to the software function, and
   wherein in a secure mode, the processing circuit executes the software function to:
     direct the decryption circuit to read the secret key;
     direct the decryption circuit to utilize the secret key to decrypt the encrypted model to generate the decrypted model; and
     store the decrypted model in the first memory.

10. The secure system as claimed in claim 9, wherein the encryption circuit utilizes the secret key to execute a symmetric encryption operation for the network model, and the decryption circuit utilizes the secret key to execute a symmetric decryption operation for the encrypted model.

11. The secure system as claimed in claim 9, wherein the offline tool further comprises:
    a provision circuit provisioning the secret key to the key management device.

12. The secure system as claimed in claim 9, wherein the offline tool is independent of the micro-controller.

13. A protection method applied in a processing circuit and comprising:
    in a non-secure mode:
      reading an encrypted model in a non-secure world;
      calling a software function in a secure world; and
      entering a secure mode; and
    in the secure mode:
      executing the software function to:
        read a secret key in the secure world;
        utilize the secret key to decrypt the encrypted model to generate a decrypted model; and
        execute the decrypted model to generate an inference result,
    wherein in the non-secure mode, the encrypted model is read and a software function is called,
    wherein the method further comprising in the non-secure mode, providing addresses of the encrypted model, the input data and the inference result to the software function, and wherein in the secure mode, executing the software function to:
   direct the decryption circuit to read the secret key;
   direct the decryption circuit to utilize the secret key to decrypt the encrypted model to generate the decrypted model; and
store the decrypted model in the first memory.

14. The protection method as claimed in claim 13, wherein the decrypted model is stored in the secure world.

15. The protection method as claimed in claim 13, further comprising:
   in the secure mode:
      storing the inference result in the non-secure world; and
   in the non-secure mode:
      reading the inference result in the non-secure world.

16. The protection method as claimed in claim 13, further comprising:
   encrypting a network model to generate the encrypted model;
   utilizing an internet to transmit the encrypted model to the non-secure world; and
   provisioning the secret key to the secure world.

* * * * *